United States Patent [19]

Bryant et al.

[11] Patent Number: 4,622,556
[45] Date of Patent: Nov. 11, 1986

[54] TECHNIQUE FOR RAPID DETERMINATION OF PROBABILITY OF DETECTION IN PULSE DOPPLER RADARS

[75] Inventors: Stephen M. Bryant, Baltimore; Donald J. Speir, Columbia, both of Md.

[73] Assignee: The United States of America as represented by the Secretary of the Air Force, Washington, D.C.

[21] Appl. No.: 657,099

[22] Filed: Oct. 2, 1984

[51] Int. Cl.⁴ .............................................. G01S 7/40
[52] U.S. Cl. ..................... 342/174; 342/93; 342/196; 342/16
[58] Field of Search .............. 343/17.7, 17.1 R, 5 DP, 343/9 R; 364/517

[56] References Cited

U.S. PATENT DOCUMENTS

| | | | |
|---|---|---|---|
| 3,794,998 | 2/1974 | Pearson, Jr. et al. | 343/17.7 |
| 4,053,890 | 10/1977 | Woodson, III et al. | 343/17.7 |
| 4,063,239 | 12/1977 | Johnson | 343/8 |
| 4,145,692 | 3/1979 | Armstrong | 343/17.7 |
| 4,305,076 | 12/1981 | Lepere et al. | 343/17.7 |
| 4,316,173 | 2/1982 | Matsumura et al. | 340/32 |
| 4,319,247 | 3/1982 | Warren | 343/17.7 |
| 4,329,688 | 5/1982 | Goldie | 343/17.7 |
| 4,423,418 | 12/1983 | Pearlman | 343/17.7 |
| 4,477,811 | 10/1984 | Collins, IV | 343/17.7 |

Primary Examiner—T. H. Tubbesing
Assistant Examiner—Gilberto Barrón, Jr.
Attorney, Agent, or Firm—Donald J. Singer; William G. Auton

[57] ABSTRACT

A technique and apparatus are disclosed for determining the performance of a pulse doppler radar system every integration period. The test is accomplished by injecting into the front end of the radar a highly calibrated signal during initialization or during a periodic test and measuring the signal at the Fast Fourier Transform (FFT) output. This measured signal is used by the radar signal processor as a reference signal which is adjusted for internally induced changes by the radar's signal processing system then summed with the in-phase amplitude of the selected range gate filter cell. The sumed signal and the cell quadrature amplitude are then envelope detected, and a detection counter is incremented when the envelope detection compares favorably with the cell's constant false alarm rate. Each integration period, the process is repeated for all range gate filter cells to obtain a detection count. Then the probability of detection is estimated using the equation:

$$P_D = \frac{(N_1 \times N_2 \times N_3)}{(N)^3} \text{ (for 3 of 3 detections)}$$

where
$N_1$ = number of detections in integration period 1;
$N_2$ = number of detections in integration period 2;
$N_3$ = number of detections in integration period 3;
$N$ = the total number of range gates tested per integration period.

7 Claims, 3 Drawing Figures

TECHNIQUE FOR RAPID DETERMINATION OF PROBABILITY OF DETECTION IN PULSE DOPPLER RADARS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to signal processors of pulse doppler radar systems and more specifically to a technique and apparatus for making probability of detection measurements in dynamic clutter and electronic counter measure (ECM) environments.

In a pulse doppler radar system, it is often desirable to assess the relative radar performance to provide a measure of radar effectiveness in the presence of sources of interference such as clutter and ECM.

The task of making such measurements is alleviated, to some degree, by the prior art technique in which a test target is injected, and the probability of detection of that test target is measured over some statistically significant number of samples. This technique, however, has the following disadvantages:

The use of a test target (either RF or digital) has the potential for interacting with normal radar performance, possibly degrading the detection sensitivity of the radar, i.e. a relatively large amplitude test target could result in the loss of detection of real smaller amplitude targets;

The use of a test target burdens the subsequent target processing unnecessarily. This burden can become significant as the effect of a single target detection grows combinatorically in pulse doppler target processing functions such as unambiguious range correlation and deghosting;

Only a small number of test targets can be injected each coherent integration period since the amount of interaction with normal target processing becomes intolerable with more than a few test targets. As a result, the gathering of a statistically significant sample of detection measures requires a large number of integration periods;

When a large number of integration periods are required for a probability of detection measurement in a scanning radar, a large azimuth sector will be scanned before a statistically significant probability of detection measurement can be completed. As a result, the measurement cannot follow rapid variations in clutter or ECM and does not accurately portray performance of the radar in narrow azimuth sectors.

In view of the foregoing discussion it is apparent that there currently exists the need for a method of making the probability of detection measurements that uses a reduced number of integration periods while accurately portraying radar performance in an environment containing rapid variations in clutter or ECM with no interaction with normal target processing. The present invention is directed towards satisfying that need.

SUMMARY OF THE INVENTION

The present invention consists of a technique and mechanization for determining pulse doppler radar performance every coherent integration period and results in no interaction with normal target processing. The measurement time is kept very short so that rapid response to rapid clutter and electronic counter-measure (ECM) variations in the environment is assured.

The test is accomplished by injecting into the front end of the radar a highly calibrated signal during initialization or during a periodic test and measuring the signal at the Fast Fourier Transform (FFT) output. This measured signal is used by the radar signal processor as a reference signal level until a subsequent update. The reference is modified on a range gate basis for saturations and block adaptive signal regulation (BASR) shifts. The modified reference value is multiplied by an internally generated error signal and the multiplier output is added to the stored I amplitude of the selected range gate-filter cell. This sum and the stored cell Q amplitude are then envelope detected. The envelope detected output is then compared with the cell's Constant False Alarm Rate (CFAR) reference. If the output exceeds the CFAR reference the detection counter is incremented.

The process is repeated until 20 cells have been processed in a coherent integration period. The count is stored in a memory and then the memory contents from the current integration period and the two preceeding integration periods are multiplied together to obtain a detection count. If the count differs from 4000 (0.5 probability) of detection by more than an amount, the error signal is changed and the process is repeated for the three integration periods. The entire procedure is repeated until the detection count criterion is satisfied. Every integration period the error signal is sent to the computer. The computer uses the reference signal power level, the attenuator setting and the error signal value to determine the signal power required for 0.5 probability of detection.

The above technique is implemented by a signal processing system containing: a register, a programmable read-only-memory (PROM), a compensation unit, two summing junctions, an envelope detector, a system memory, a log 2 circuit, and a comparison unit. The register records the amplitude of the calibrated signal (reference signal). The PROM adjusts the reference signal for attenuation in the clutter filter and the compensation unit adjusts for A/D saturation and automatic gain control (AGC) actions.

The first summing junction sums the modified reference signal vectorally with the doppler filter output from the host radar system to produce a sum signal. The envelope detector performs envelope detection on the sum signal and sends notification to the system memory, which accummulates the detections and outputs a detection count N for the current and previous two integration periods.

The probability of detection $P_D$ is estimated using the formula:

$$P_D = \frac{(N_1 \times N_2 \times N_3)}{(N)^3} \text{ (for 3 of 3 detections)} \quad (1)$$

where $N_1$=number of detections in integration period 1;
$N_2$=number of detections in integration period 2;
$N_3$=number of detections in integration period 3;
N=the total number of range gates tested per integration period.

It is a principal object of the present invention to provide a new and improved method and apparatus of making probability of detection measurements for pulse doppler radar systems.

It is another object of the present invention to make probability of detection measurements in an environment containing rapid variations in clutter or electronic counter-measures.

It is another object of the present invention to make probability of detection measurements without interacting on normal target processing.

It is another object to the invention to make probability of detection measurements using a reduced number of coherent integration periods.

These together with objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention disclosure describes a technique and mechanization for determining pulse doppler radar performance every coherent integration period and results in no interaction with normal target processing.

Figure 1:
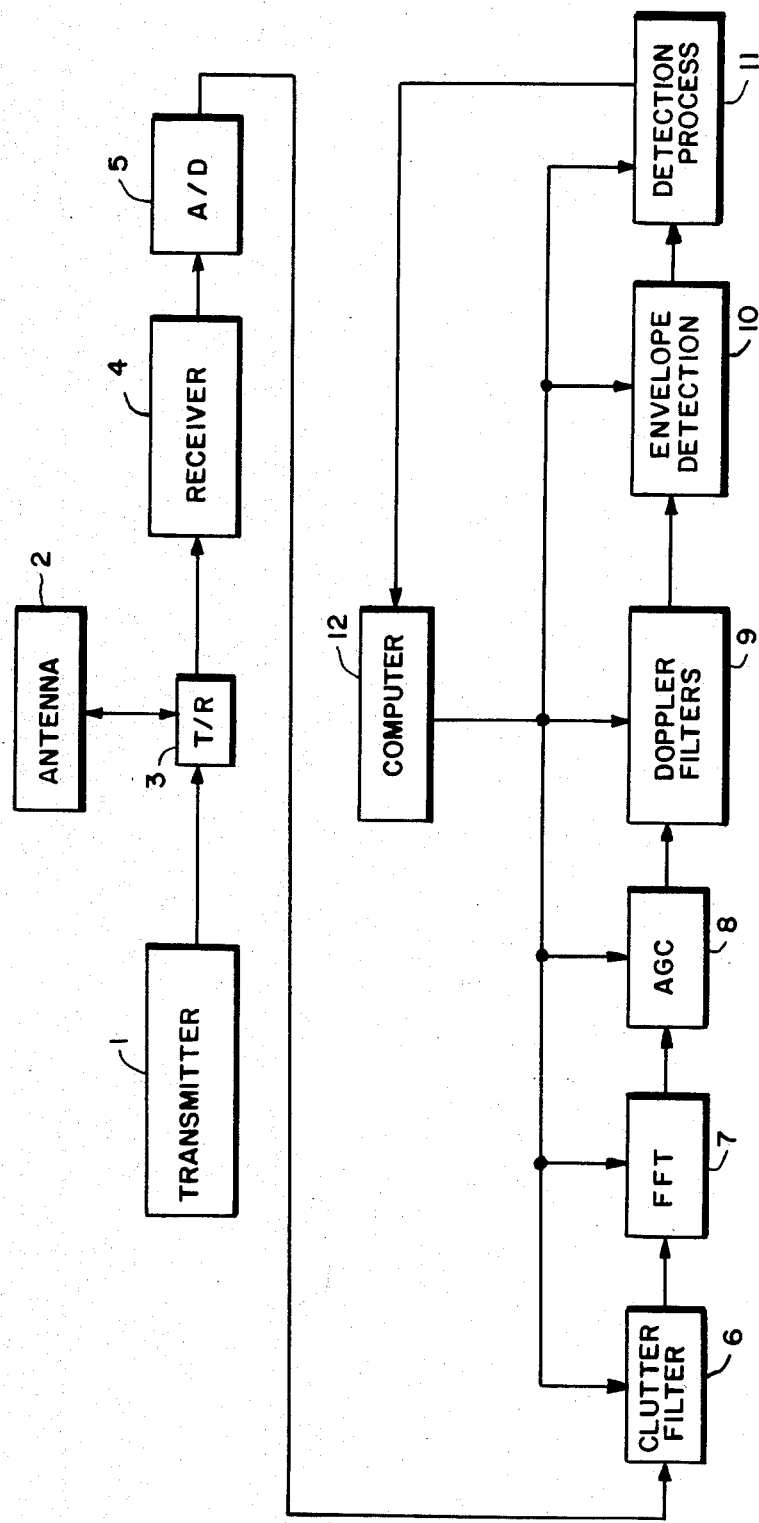
FIG. 1 is a block diagram of a prior art pulse doppler radar system.

Referring now to the prior art pulse doppler radar system illustrated in the schematic block diagram of FIG. 1, energy from the transmitter 1 is fed to the antenna 2 through the conventional transmit-receive or T-R switch to the radar receiver 4 in a conventional manner.

The output signal from the radar receiver is converted into a digital signal by the analog-to-digital (A/D) converter 5 and fed through a conventional clutter filter 6 and fast Fourier transform 7 and an automatic gain control (AGC) circuit 6 which applies a selective gain to target returns before they enter the target processor.

Received radar signals are then processed by a doppler filter bank 9 and envelope detected 10 before the detection process 11 notifies the computer 12 of a detection.

The concept of this invention is embodied in the following sequence of events and is assumed to occur in a radar signal processor, such as that shown in FIG. 1:

During a test mode, either at radar initialization or during a periodic test update, a high level calibrated signal is injected into the front end of the radar and measured at the FFT output. This measured signal is used by the radar signal processor as a reference signal level until a subsequent update. This update will occur at a periodic test rate, which may be typically on the order of every 180 seconds.

Figure 2:
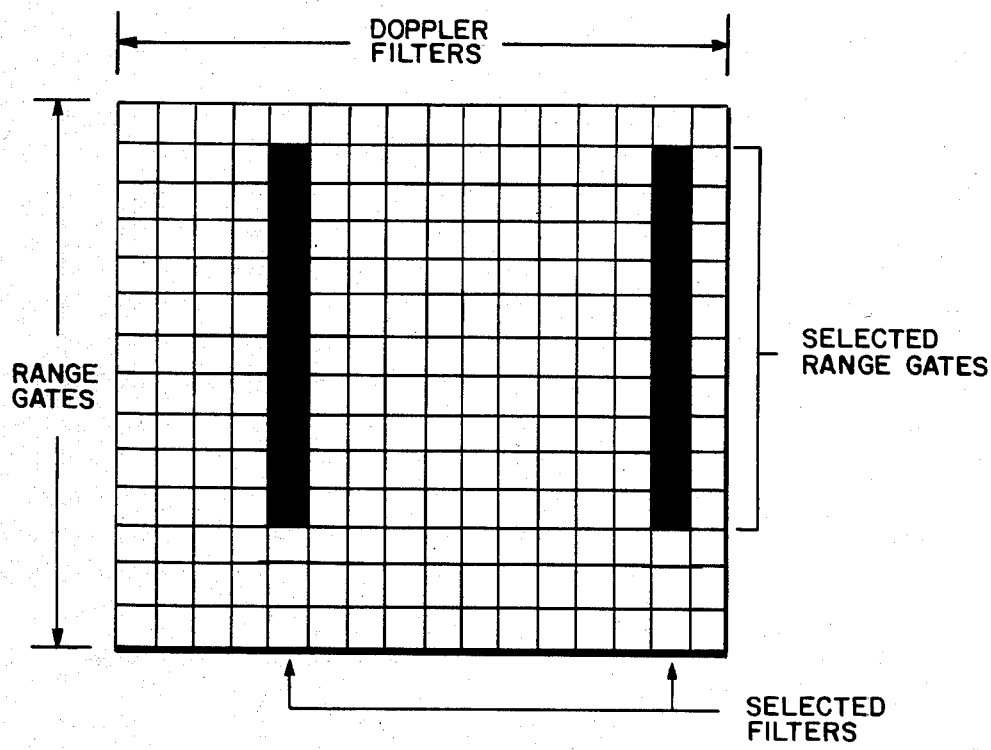
FIG. 2 is a sketch depicting the range gates and doppler filters of the radar system of FIG. 1.

In the signal processor, the reference signal is adjusted to reflect significant variations in the processing environment, such as clutter notch attenuation, automatic gain control (AGC) action, and A/D saturations. After compensation, the reference signal is then vectorially added into a number of range gates, N, of a selected filter at the output of the doppler filter bank, see FIG. 2. Note that more than one filter (and in fact the entire doppler space) can be accommodated by this technique with an associated increase in hardware complexity.

Each range gate for the selected filter(s) is the envelope detected and compared to the detection threshold generated in the normal processing channel for that same range gate-filter cell. The detections are counted and stored for each integration period.

When detection counts from three integration periods are available, the probability of detection ($P_D$) can be estimated as shown in equation 1:

$$P_D = \frac{(N_1 \times N_2 \times N_3)}{(N)^3} \text{ (for 3 of 3 detections)} \quad (1)$$

where $N_1$ = number of detections in integration period 1;
$N_2$ = number of detections in integration period 2;
$N_3$ = number of detections in integration period 3;
$N$ = the total number of range gates tested per integration period.

The $P_D$ measurement is based upon N range gates per integration period. If N is twenty, for example, the resulting sample size is $20^3$ or 8000. An accurate $P_D$ measurement may be generated every integration period (note, there is a two integration period delay in initiating this processing), and as a result, the $P_D$ measurement will be able to follow very rapidly changing external conditions such as those that occur in a clutter or ECM environment.

An alternate approach that alleviates the requirement to perform the division operation in [1] involves the iterated attenuation (or amplification) of the reference signal to maintain a constant $P_D$, say 50 percent. The amount of attenuation (or amplification) of the reference signal required during any one integration period is a direct indication of the relative change in the $P_D$ during that period. This approach appears to be more hardware efficient, and it is this mechanization that is described in the following section.

Performance at all velocities (doppler filters) may be assessed simultaneously using this technique, or to conserve hardware, velocities could be time multiplexed in multiples of three integration periods, and assessment of all velocities could be accomplished every few degrees of azimuth depending on specific system parameters such as scan rate and number of doppler filters.

Figure 3:
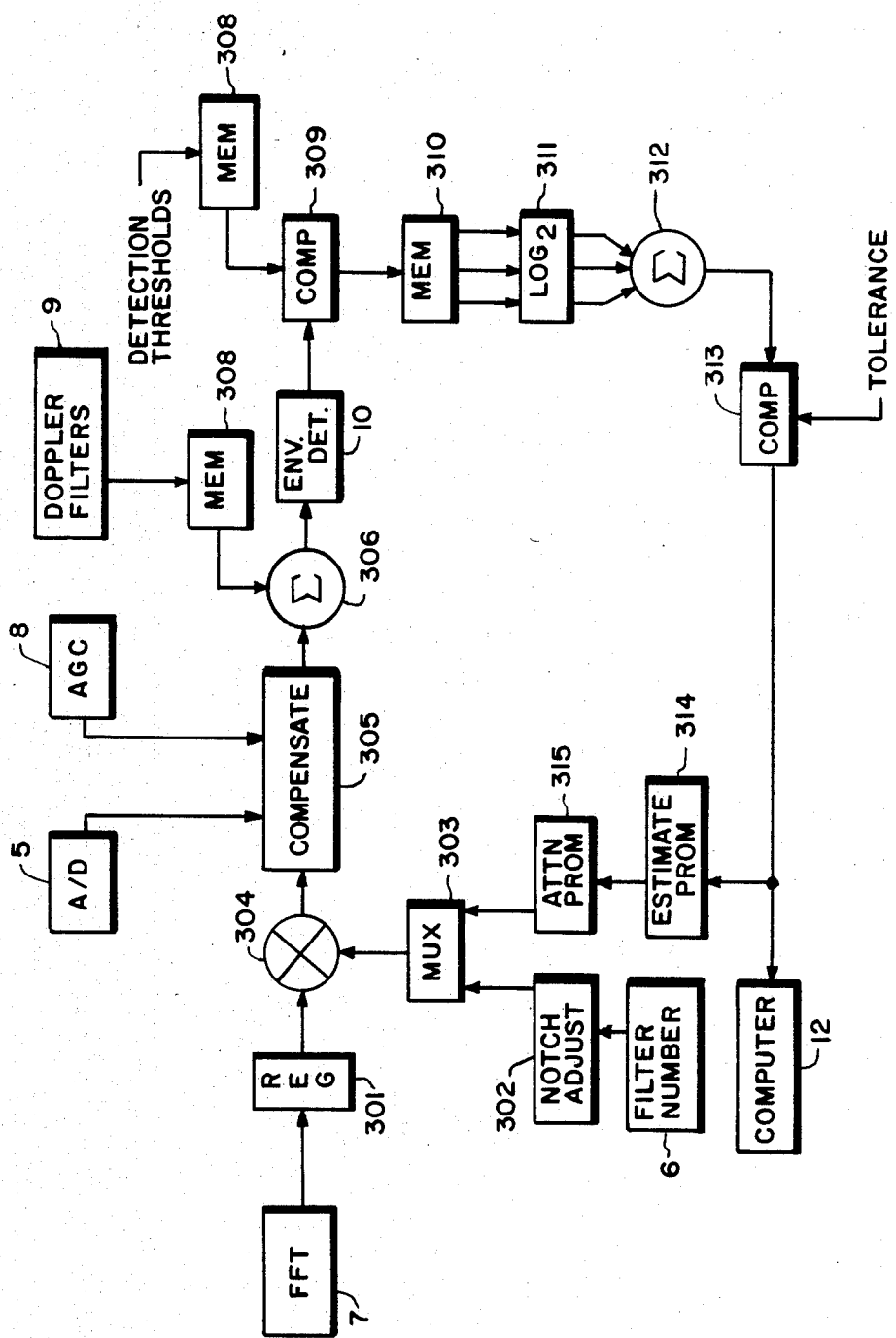
FIG. 3 is a block diagram of one embodiment of the present invention.

FIG. 3 is a functional block diagram of one embodiment of the present invention which is used with the pulse doppler radar system of FIG. 1.

The reference signal is received at register 301 from the output of the FFT 7 of the pulse doppler radar system. The amplitude of this reference signal is then adjusted for the following events which occur in the signal processor: First, a notch adjust programable read-only-memory (PROM) 302 provides an adjustment value for the attenuation of the clutter filter 6 for the particular filter number used in the doppler filter bank. This adjustment value is read through the multiplexer 303 into the complex multiplier 304, which provides the first adjustment to the incoming reference signal.

Similarly to the above, a compensation unit 305, known in the art, adjusts the reference signal for saturation from the A/D converter 5 and the action by the automatic gain control 8.

The adjusted reference signal from the compensation unit 305 is then summed vectorially by the first summing junction 306 with the output of the doppler filter 9 of the radar system, producing a summed reference signal.

The summed reference signal from the first summing junction is then envelope detected by the envelope detector 10 of the radar signal processing system, and compared to the detection threshold generated in the main processing channel for that same doppler filter 9 by the first comparison element 309.

The detections are accumulated into a memory 310 that has been divided into three sements. Two of the segments contain detection counts for the previous two integration periods, the third segment is used to read and write detection counts for the current integration period. The product of $N_1$, $N_2$, and $N_3$ is then determined by taking at element 311, the $Log_2$ of the detection count and summing at the second summing junction 312. The result is the probability of detection signal $P_D$ which is estimated through the use of equation 1, as discussed above.

The probability of detection signal $P_D$ is then compared, by the second comparison element 313, to an upper and lower threshold to determine if $P_D$ is within a tolerance at the specified level. If $P_D$ is within tolerance, this indicates the radar is still performing at the reference signal level. If is is out of tolerance, however, the reference signal level must be compensated. The level of compensation is estimated by examining the direction and the magnitude of the deviation from the tolerance, by PROM 314. The estimate of the direction and magnitude of the deviation is used by the attenuation PROM 315, which in turn selects an attenuation (or amplification) multiplier for the reference signal. The above procedure is repeated until the $P_D$ measurement is within tolerance of the specified level.

The technique of counting the radar's detection sensitivity for a commanded filter consists of the following steps:

1. Producing the reference signal by injecting a calibrated signal into the front end of the radar and measuring the FFT output.

2. Modifying the reference signal for: clutter notch attenuations, automatic gain control action, A/D saturations and BASR shifts.

3. The modified reference value is multiplied by an internally generated error signal and the multiplier output is added to the stored in-phase (I) amplitude of the selected range gate-filter cell. This sum and the stored cell quadrature (Q) amplitude are then envelope detected.

4. The envelope dtected output is the compared with the cell's constant false alarm rate (CFAR) reference. If the output exceeds the CFAR reference the detection counter is incremented.

5. The process is repeated until 20 cells have been processed in a coherent integration period. The count is stored in a memory and then the memory contents from the current integration period and the two preceeding integration periods are multiplied together to obtain a detection count.

6. If the count differs from 4000 (0.5 probability) of detection by more than an amount, the error signal is changed and the process is repeated for the three integration periods.

7. The entire procedure is repeated until the detection count criterion is satisfied.

8. Every integration period the error signal is sent to the computer. The computer uses the reference signal power level, the attenuator setting and the error signal value to determine the signal power required for 0.5 probability of detection.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a pulse doppler radar system having a radar receiver with a plurality of range gates, with a signal processing system containing an analog-to-digital converter, a clutter filter, a fast Fourier transform, an automatic gain control circuit, a doppler filter bank and an envelope detector, said signal processing system being controlled by a system computer, a probability of detection system comprising:

a register storing and receiving a reference signal from said fast Fourier transform, said reference signal occuring when said system computer directs an input of a calibrated signal into said radar receiver, said register outputting said reference signal;

a first adjusting means receiving and adjusting said reference signal from said register by producing an adjusted reference signal being adjusted for saturation from said analog-to-digital converter, actions by said automatic gain control and notch adjustment from said clutter filter;

a first summing means receiving said adjusted reference signal from said first adjusting means, and vectorally adding said adjusting reference signal into said plurality of range gates of a selected doppler filter at the output of said doppler filter bank, said first summing means outputting a summed reference signal to said envelope detector resulting in an envelope detection signal;

a first comparison means receiving and comparing said envelope detection signal from said envelope detector, with a detection threshold from a first memory means in said pulse doppler radar system, said first comparison means outputting a detection count for each integration period of said signal processing system;

a second memory means receiving said detection count from said first comparison means and outputting a first, second, third and fourth count signals, said first count signal equaling the detection count for the current integration period, the second and third count signals equaling the detection counts received from said first comparison means for the previous two integration periods, and the fourth count signal equaling the total number of range gates tested per integration period;

a calculation means receiving said count signals from said second memory means and calculating a probability of detection signal $P_D$ wherein $$P_D = \frac{(N_1 \times N_2 \times N_3)}{(N)^3}$$

where $N_1$, $N_2$ and $N_3$ equal respectively said first, second and third count signals, N equals said fourth count signal.

2. A probability of detection system as defined in claim 1 including a second adjusting means receiving and comparing said probability of detection signal from said calculating means with an upper and lower threshold and sending an adjustment input to said first adjusting means to bring said probability of detection signal within said upper and lower threshold.

3. A probability of detection system as defined in claim 2 wherein said first adjusting means comprises:
   a first programable read-only-memory receiving a signal indicating an amount of attenuation produced by said clutter filter, and producing an adjustment value which, when applied to said reference signal, would compensate for said attenuation;
   a multiplexer receiving said adjustment value from said first programable read-only-memory and said adjustment input from said second adjusting means, said multiplexer producing an output signal indicating an amount of amplification or attenuation that should be applied to said reference signal;
   a complex multiplier producing an output signal by receiving and multiplying said reference signal from said register by said output signal from said multiplexer;
   a compensation unit producing said adjusted reference signal by receiving and adjusting said output signal from said complex multiplier for saturation from said analog-to-digital converter and actions by said automatic gain control.

4. A probability of detection system as defined in claim 3 wherein said calculation means comprises:
   a $Log_2$ element receiving said count signals from said second memory means and producing a first, second, third and fourth log signals, said first log signal equaling $Log_2$ (first count signal), said second log signal equaling $Log_2$ (second count signal), said third log signal equaling $Log_2$ (third count signal) and said fourth log signal equaling $Log_2$ (fourth count signal); and
   a second summing means producing said probability of detection signal by: adding said first, second and third log signals together to produce a first sum signal, adding said fourth log signal to itself twice to produce a second sum signal, and subtracting said second sum signal from said first sum signal.

5. A probability of detection system as defined in claim 4 wherein said second adjusting means comprises:
   a second comparison means receiving and comparing said probability of detection signal from said calculation means with an upper and lower threshold, said second comparison means producing an output signal;
   a second programable read-only-memory receiving said output signal from said second comparison means and producing an output signal indicating a direction and magnitude of deviation of said probability of detection signal from said upper and lower threshold of said second comparison means; and
   a third programble read-only-memory receiving said output signal from said second programable read-only-memory and producing and sending said adjustment input to said first adjusting means, said adjustment input indicating an amouunt of amplification and attenuation that is required to bring said probability of detection signal within said upper and lower threshold.

6. A technique of indicating a probability of detection by a radar system having a signal processing system, clutter filter, automatic gain control, doppler filter bank and analog-to-digital converter, said technique comprising the steps of:
   producing a reference signal by injecting a calibrated signal into a radar receiver and measuring an output signal from a fast Fourier transform in said radar's signal processing system;
   modifying said reference signal for attenuations in said radar's clutter filter, actions by said radar's automatic gain control, and saturations by said radar's analog-to-digital converter, said modifying step resulting in production of a modified reference value;
   adding said modified reference value to an in-phase amplitude of a selected range gate filter cell in said radar's doppler filter bank, said adding step resulting in a summed reference signal;
   envelope detecting said summed reference signal along with a stored cell quadrature amplitude from said radar's doppler filter bank, said envelope detecting step resulting in an envelope detection output signal;
   comparing said envelope detection output signal with a constant false alarm rate value for said selected range gate filter cell and incrementing a detection counter when said envelope detection output exceeds said constant false alarm rate reference value;
   repeating sid producing, modifying, adding, envelope detecting and comparing steps until all range gate filter cells have been processed in a coherent integration period, said repeating step resulting in a detection count for a current integration period;
   estimating a probability of detection to provide a probability of detection signal;
   adjusting said modified reference signal; and
   repeating said producing, modifying, adding, envelope detecting, comparing and estimating steps when said probability of detection signal is not within a desired range said adjusting step being repeated until a desired detection count is satisfied.

7. A technique as defined in claim 6 wherein said estimating step comprises the steps of:
   multiplying said detection count from said current integration period from said repeating step by the detection counts obtained in two previous integration periods, said multiplying step producing a first product;
   obtaining and cubing a number which represents the total number of range gates that are tested each integration period in said radar system, said obtaining and cubing step resulting in a cubed number; and
   calculating the probability of detection by dividing said first product by said cubed number.

* * * * *